United States Patent [19]
Mori

[11] Patent Number: 4,609,974
[45] Date of Patent: Sep. 2, 1986

[54] LIGHT RADIATOR

[76] Inventor: Kei Mori, 3-16-3-501, Kaminoge, Setagaya-ku, Japan

[21] Appl. No.: 743,245

[22] Filed: Jun. 11, 1985

[30] Foreign Application Priority Data

Jun. 15, 1984 [JP] Japan ................. 59-124299

[51] Int. Cl.⁴ .............................. F21V 7/04
[52] U.S. Cl. ...................... 362/32; 362/96; 362/101; 362/805
[58] Field of Search ............. 362/1, 2, 32, 96, 101, 362/216, 276, 277, 296, 318, 319, 805

[56] References Cited

U.S. PATENT DOCUMENTS 2,827,825  3/1958  White ........................... 362/318
4,349,864  9/1982  Smith ........................... 362/805

FOREIGN PATENT DOCUMENTS 2133719  12/1977  Fed. Rep. of Germany ......... 362/1
641241  6/1928  France ............................. 362/101

*Primary Examiner*—Craig R. Feinberg
*Assistant Examiner*—David A. Okonsky
*Attorney, Agent, or Firm*—Jordan and Hamburg

[57] ABSTRACT

A light radiator for effectively diffusing and radiating light rays which have been transmitted through an optical conductor. The light radiator comprises a transparent cylinder, optical means movably accommodated in the cylinder for reflecting light rays guided into the cylinder from the optical conductor and radiating the light rays outside the cylinder, and driving means for moving the optical means along an axis direction of the cylinder. The optical means being constructed with elliptic globe having a short diameter approximately equal to the inner diameter of the cylinder and comprising an air chamber having a reflection surface for reflecting light rays guided into the cylinder and radiating the same outside the cylinder in the inner space thereof. The driving means comprises optical oil filled in the cylinder and a liquid pump having an end portion communicating with the end portion of the cylinder and another end portion communicating with the other end portion of the same. The optical means being moved in the cylinder by use of the liquid pump.

15 Claims, 8 Drawing Figures

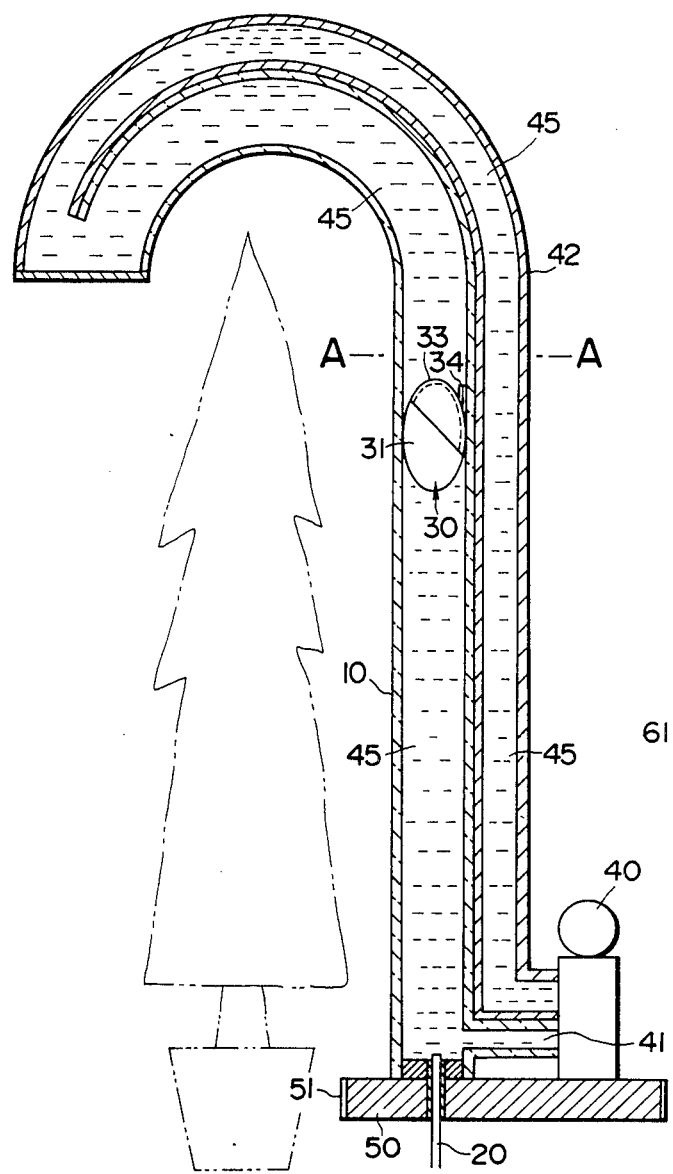
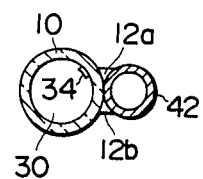
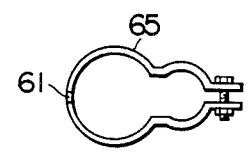

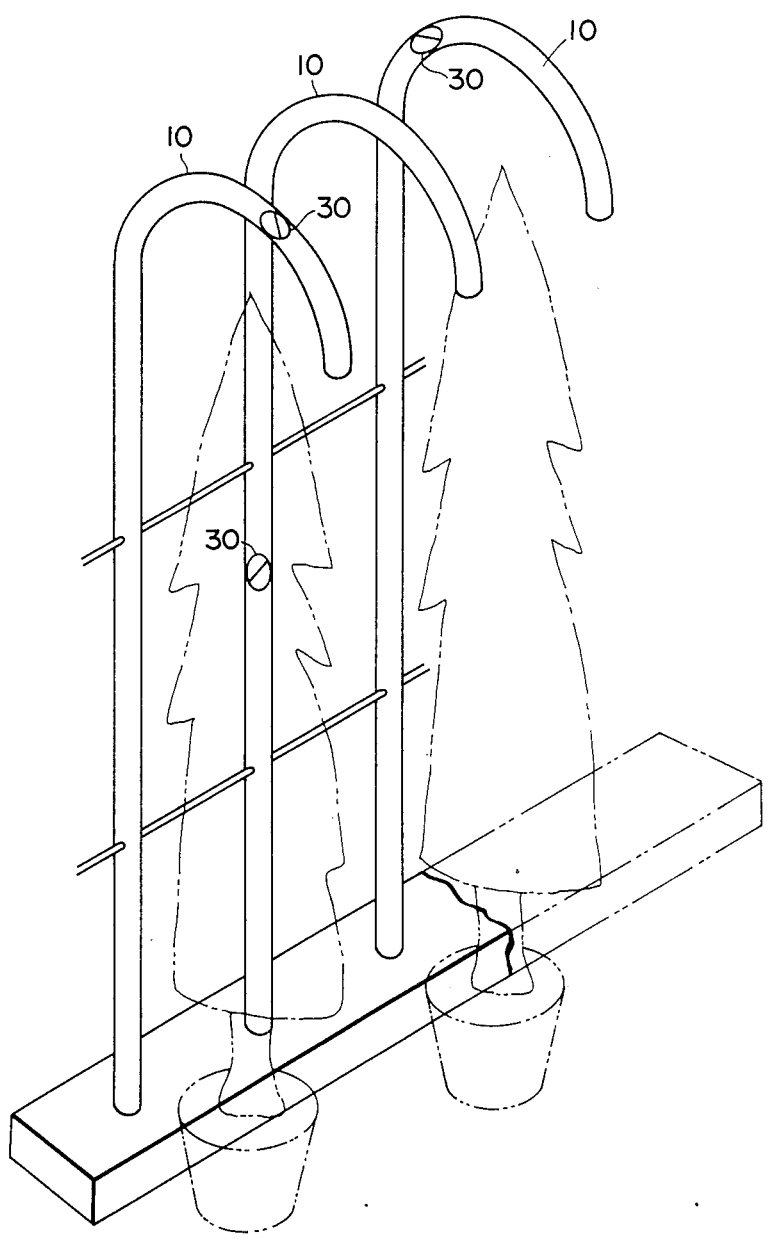

4,609,974

LIGHT RADIATOR

BACKGROUND OF THE INVENTION

The present invention relates to a light radiator for effectively diffusing and radiating light rays, which have been transmitted through an optical cable or the like outside of said optical conductor cable.

The present applicant has previously proposed various ways to focus solar rays or artificial light rays by use of lenses or the like, to guide the same into an optical conductor cable, and thereby to transmit them onto an optional desired place through the optical conductor cable. The solar rays or artificial light rays transmitted and emitted in such a way are employed for photo-synthesis and for use in illuminating or for other like purposes, for example, to promote the cultivation of plants.

However, in the case of utilizing the light energy for cultivating plants as mentioned above, the light rays transmitted through the optical conductor cable has directional characteristics. Supposing that the end portion of the optical conductor cable is cut off and the light rays are emitted therefrom, the radiation angle for the focused light rays is, in general, equal to approximately 46°. That is quite a narrow field. In the case of utilizing the light energy as described above, it is impossible to perform a desirable amount of illumination by simply cutting off the end portion of the optical conductor cable and by letting the light rays emit therefrom.

Therefore, the present applicant has already proposed various kinds of light radiators capable of effectively diffusing the light rays which have been transmitted through an optical conductor cable and radiating the same for illumination over a desired area. The present invention was made forming a link in the chain thereof. In particular, the inventor aims at applying intensified light rays to a desired position of the plants by keeping the light source at a distance to the plants and by moving the light source back and forth in order to supply the light rays over a wider area.

SUMMARY OF THE INVENTION

It is an object of the present invention to provide a light radiator capable of effectively emitting the solar rays or the artificial light rays transmitted through an optical conductor cable outside the same for preferably nurturing the plants.

It is another object of the present invention to provide a light radiator suitable for nurturing the tall trees grown as plant for appreciation in a building or the plants set in a row or a circle on a plane in a building.

It is another object of the present invention to provide a light radiator suitable for use as a light source performing a photo synthesis-reaction effectively.

It is another object of the present invention to provide a light radiator capable of supplying light rays to the tall tree from the lower portion to the upper portion thereof.

It is another object of the present invention to provide a light radiator moving up and down rotatingly or performing a gooseneck movement.

It is another object of the present invention to provide a light radiator having an optical means which can be moved up and down, and rotated in a cylinder.

The above-mentioned features and other advantages of the present invention will be apparent from the following detailed description which goes to with the accompanying drawings.

BRIEF DESCRIPTION OF THE DRAWINGS

FIG. 4 is a cross-sectional construction view for explaining another embodiment of the present invention;

FIG. 5 is a cross-sectional view taken along the section line A—A of FIG. 4;

FIG. 6 is a plan view showing an example of a holder for holding a photo sensor;

FIG. 8 is a perspective view showing still another embodiment the single-leaf screen constructed with a large number of light radiators according to the present invention.

DESCRIPTION OF THE PREFERRED EMBODIMENTS

Figure 1:
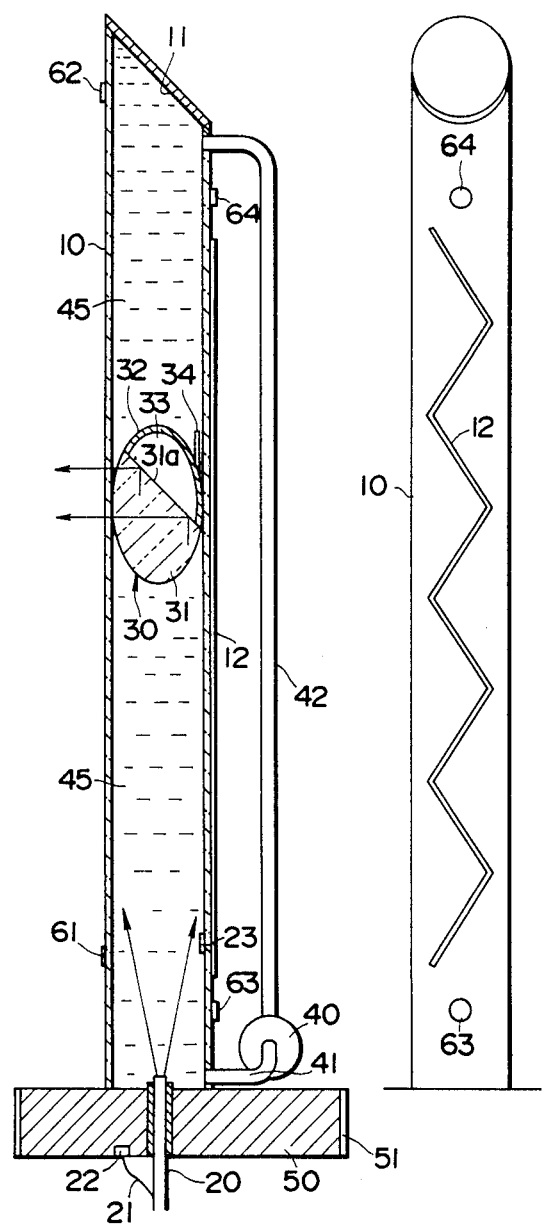
FIG. 1 is a cross-sectional construction view for explaining an embodiment of a light radiator according to the present invention.

FIG. 1 is a cross-sectional construction view for explaining an embodiment of a light radiator according to the present invention. In FIG. 1, 10 is a transparent cylinder, 20 optical conductor, 30 optical means, 40 a liquid pump, and 50 a foundation. A light-emitting edge of the optical conductor 20 is installed at the lower end portion of the cylinder. The light rays transmitted through the optical conductor 20 are emitted into the cylinder 10 from the light-emitting edge of the optical conductor 20, and transmitted upward by reflecting the inner and outer wall surfaces of the cylinder 10.

In the cylinder 10 is slidably inserted the transparent optical means 30 of elliptic glove shape having a short diameter approximately equal to the inner diameter of the cylinder 10. The lower end side of the optical means, that is, the side thereof for receiving the light rays transmitted is constructed with a transparent body 31 having an inclined surface 31a formed by cutting the same at an angle of about 45° in respect to the long axis of the transparent body formed in an elliptic glove, while the upper end side of the optical means is constructed with a hollow transparent member 32 of elliptic glove shape for supplementing the cut-off portion of the afore-mentioned transparent body of elliptic glove shape, in which an air chamber 33 is formed.

Therefore, the light rays guided into the cylinder 10 in such a manner as mentioned above enter the optical means 30 from the transparent elliptic glove 31 of the optical means 30. And then, the light rays are reflected on the inclined surface 31a and emitted outside the cylinder 10. Plants or the like are cultivated outside the cylinder 10. The light rays emitted from the cylinder 10 as mentioned above are supplied to the plants as a light source performing a photo synthesis reaction.

A pipe 41 is connected with the lower end portion of the cylinder 10 and a pipe 42 is connected with the upper end portion of the same. The optical oil 45 is supplied into the cylinder 10 through those pipes 41 and 42. A differential pressure is applied between the lower side and the upper side of the optical means 30 through the optical oil 45 by use of the liquid pump 40. The optical means 30 can be moved up and down in the cylinder 10 by the action of the afore-mentioned differential pressure and the empty weight of the optical means 30. In such manner, the light rays can be supplied to the trees from the lower portion to the upper portion thereof.

The numerals 61 and 62 represent photo sensors mounted on the outer circumferential surface of the cylinder 10 at the side through which the light rays reflected by the optical means 30 pass. The photo sensor 61 detects an arrival of the optical means 30 at the lower end of the cylinder 10, and the detection signal generated therefrom controls the liquid pump 40 so as to supply the differential pressure to the optical means 30 and move it upward. On the other hand, the photo sensor 62 detects and arrival of the optical means 30 at the upper end of the cylinder 10, and the detection signal generated therefrom controls the liquid pump so as to supply the differential pressure to the optical means 30 and move it upward.

Those photo sensors 61 and 62 are constructed in such a manner that the sensors can be removed from the cylinder 10 and moved along the same. Such a construction enables that, when the trees are small, the photo sensor 62 is installed at the lower portion thereof, and when the trees grow up, it is moved upward. Therefore, the light rays transmitted from the optical conductor 20 can be effectively supplied to the trees.

The numeral 11 represents a reflection surface formed at the upper end side of the above-mentioned cylinder 10. The light rays passing through the optical means 30 and leaking upward from the cylinder 10 are reflected on the reflection surface 11 and emitted outside the cylinder 10. In such a manner, the surface of the ceiling is illuminated. The numeral 34 represents a permanent magnet installed at a position where the light rays reflected on the reflection surface 31a of the outer circumferential surface of the optical means 30 are not prevented from passing therethrough. When such a permanent magnet 34 is unitarily mounted on the optical means 30, the location of the optical can be detected by detecting that of the permanent magnet 34. On that occasion, magnetic sensors 63 and 64 are employed instead of the photo sensors 61 and 62.

Moreover, the position signal detected by the magnetic sensors 63 and 64 is employed in order to control the liquid pump 40 as is the case of the afore-mentioned photo sensor, and thereby the optical means 30 is moved up and down. The numeral 12 represents a permanent magnet or magnetic substance installed so as to elongate along the axis of the cylinder 10. The optical means 30 is so regulated as to turn to a desired direction by use of the permanent magnet or magnetic substance 12.

Figure 2:
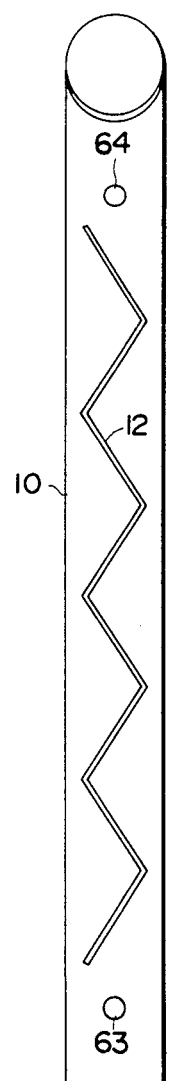
FIGS. 2 and 3 are views showing examples of a method of arranging magnetic substance 12.

Namely, a magnetic attraction force acts between the permanent magnet 34 mounted on the optical means 30 and the permanent magnet or magnetic substance 12 mounted on the cylinder 10. The optical means 30 is moved up and down by the action of the magnetic attraction force in the state that the permanent magnet 34 opposes to the permanent magnet or magnetic substance 12. On the occasion as shown in FIG. 1, since the permanent magnet or magnetic substance 12 is installed in a state of a linear line, the optical means 30 is moved up and down linearly, namely, without accompanying any revolutional movement. However, in case that the permanent magnet or magnetic substance 12 is spirally arranged around the cylinder 10, the optical means 30 is moved up and down accompanying revolutional movement. When it is arranged zigzag as shown in FIG. 2, the optical means 30 is moved up and down rotatingly, in other words, performing a gooseneck movement to the right and left directions.

In general, the trees have widely-spread branches at the lower portion thereof and the extent of branch-spreading becomes small at the upper portion thereof. Therefore, the angle of the gooseneck movement is set large at the lower portion and it turns out to be small at the upper portion in order to effectively supply the light rays to the plant. For this reason, the width of the zigzag line as mentioned above may be widened at the lower portion and narrowed at the upper portion. Furthermore, the movement speed in the up and down directions may be high at the lower portion and the same may be low at the upper portion.

Figure 3:
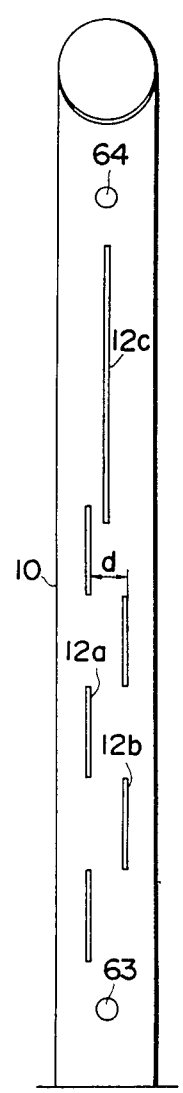

Several cases in which the magnetic substance 12 is installed continuously has been described heretofore. However, as shown in FIG. 3, it may be possible to install discontinuously two raws of the magnetic substances 12a and 12b zigzag in parallel with each other. Even on that occasion, the distance d at the lower portion of the plant is widened, while the same at the upper portion thereof is narrowed and only one row of the magnetic substance 12c is installed at the uppermost portion for example. When the optical means 30 moves up and down at the lower position, it performs the gooseneck movement between 12a and 12b. On the contrary, at the upper portion it moves up and down linearly without performing the gooseneck movement. In such a manner, the light rays can be effectively supplied to the trees.

An optical fiber diverging from the optical conductor 20 and taken outside therefrom is represented by 21. A photo sensor 22 is mounted on the tip end portion of the optical fiber 21. By means of the photo sensor 22, the light rays supplied in the optical conductor 20 are detected. At the time of detecting the light rays the pump 40 is driven, while at the time of non-detection it is stopped.

Moreover, in addition to the above-mentioned detection of the light rays, the light rays supplied from the optical conductor 20 is detected, for example, by the photo sensor 23 installed in the cylinder 10, and the pump 40 is controlled by the detection signal. There are various detection methods as mentioned heretofore.

A gear mounted on the circumferential portion of the foundation 50 is represented by 51. For instance, a motive power is transmitted to the foundation 50 by means of a motor not shown in the drawing through the medium of the gear 51 in order to rotate or rotatably move the foundation 50. At this time, the cylinder 10 rotates together with the foundation 50. In consequence, the direction of the light rays emission from the cylinder 10 changes. Therefore, the illuminating direction of the light rays can be changed not only up and down but in the direction of the rotation angle so that the light rays can illuminate an area over a wider range.

FIG. 4 is a cross-sectional construction view for explaining other embodiment of the present invention. In this embodiment, the cylinder 10 and the optical oil supplying pipes 41 and 42 as shown in FIG. 1 are unitarily constructed previously so as to facilitate the handling thereof. The operational principle of such construction is quite same as that of the embodiment shown in FIG. 1.

FIG. 5 is a cross-sectional view taken along the section line A—A of FIG. 4. In this embodiment, the above-mentioned permanent magnets or magnetic substances 12 divided into the portions, 12a and 12b, are arranged in a state of zigzag at the side of the optical oil supplying pipe 42 so as to hold it therebetween, as shown in FIG. 3. In such a manner, the optical means 30 is guided as is the case of FIG. 3.

FIG. 6 is a cross-sectional view showing a holder 65 for holding a photo sensor 61 or 62. The holder 65 is a band for unitarily surrouding the cylinder 10 and the optical oil supplying pipe 42. The photo sensor 61 or 62 is installed at the position corresponding to the emission side of the light rays in the cylinder 10. The holder 65 can be fastened at the opposite side that is the portion surrounding the optical oil supplying pipe.

In consequence, in order to adjust the position for mounting the photo sensor, the holder can be moved along the cylinder 10 and fixed at the desired position. Therefore, the movement range of the optical means can be easily adjusted.

As described before, according to the present invention, the optical means 30 is constructed with a transparent member of elliptic globe shape having a short diameter approximately equal to the inner diameter of the cylinder 10. Therefore, the optical means 30 can be moved in the cylinder 10 in the axis direction thereof, in the case of employing the cylinder 10 constructed along a linear line as a matter of course and in the case of employing the same constructed in a circular arc shape.

Consequently, as shown in FIG. 4, it is possible that the tip end portion of the cylinder 10 is constructed in a circular arc shape. By use of such a construction as mentioned above, the light rays can be supplied horizontally to the tree at the lower portion of the tree and the same can be supplied from right overhead to the tree at the upper portion thereof. Otherwise, the cylinder 10 can be constructed in a state of spiral so that the optical means 30 moves in the spiral cylinder, or the cylinder 10 can be constructed in a state of circular arch so as to supply the light rays to the plants inside or outside the arch-shaped cylinder. Since the cylinder 10 can be constructed in a state of the optional desired shape, it is possible to construct a light radiator suitable for the purpose of usage.

Figure 7:
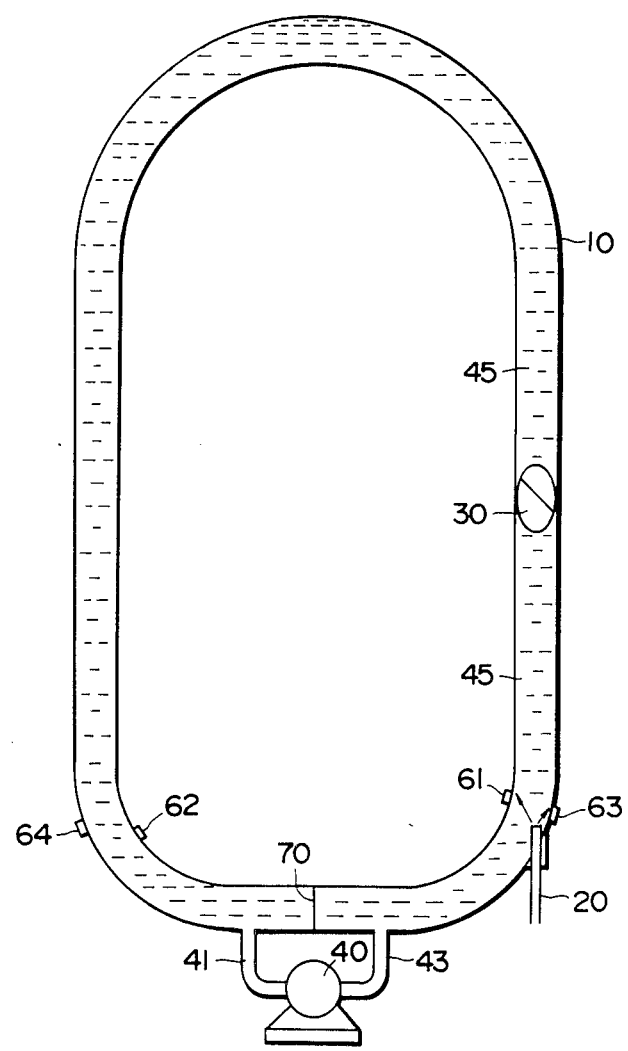
FIG. 7 is a cross-sectional construction view for explaining still another embodiment constructed in a state of loop.

FIG. 7 is a construction view showing an embodiment in which the cylinder 10 is constructed in a state of loop utilizing the characteristics of the present invention as mentioned above. The cylinder 10 is constructed in a state of loop as shown in FIG. 7, and a partition plate 70 divides the inner space of the cylinder at an optional position thereof. The optical oil 45 is supplied into the cylinder 10 by means of the liquid pump 40 from both end portions of the cylinder 10 divided by the partition plate 70. The optical means 30 is moved by the action of the differential pressure applied to both end portions of the optical means 30 as is the case of the other embodiments described before. The direction of its movement is detected by use of the photo sensors 61 and 62 or the magnetic sensors 63 and 64, and the detection signal generated therefrom controls the movement of the optical means 30. The operational theory mentioned above is quite same as that of the other previous embodiments. On that occasion as shown in FIG. 7, the light rays radiated from the optical means are radiated to the internal side of the loop. However, the same can be radiated to the external side of the loop. Otherwise, the light rays to be radiated (or the optical means 30) can be rotated or rotatingly moved in the cylinder 10.

FIG. 8 is a perspective view showing an embodiment of a single-leaf screen of the light radiators constructed by utilizing the characteristics of the present invention as mentioned above. This embodiment shows a construction formed by setting up in parallel a plurality of light radiators as shown in FIG. 4. In such a manner, it follows that only one liquid pump is employed and all of the light radiators can be controlled by the photo sensor or the magnetic sensor installed at an optional desired cylinder. In consequence, such a construction enables a wide range of illumination at a small expense.

On the contary, in the case of controlling the movement of the optical means per the respective cylinders, the expense for illumination turns out to be large. However, in such a manner, the optical means can be set at an optional desired position per the respective cylinders. Therefore, the light source is located at random so that it turns out to be preferable for cultivating the plants or the like.

Moreover, although the embodiment of setting up a large number of light radiators in a state of a single-leaf screen is shown in FIG. 8, it may be easily understood that a large number of light radiators can be preferably combined with each other so as to form in an optional desire shape depending upon the necessity thereof.

As is apparent from the foregoing description, according to the present invention, it is possible to provide a light radiator in which the solar rays or the artificial light rays transmitted through the optical conductor can be effectively diffused and illuminate the area over a wider range. In particular, the light radiator according to the present invention is preferable for supplying the light rays to the tall plants, the circularly or linearly distributed plants, etc. from the light source for use in the photo-synthesis in the most preferable status in accordance with the condition of the plants. And further, since the light source moves, the bright and dark light rays can be repeatedly supplied to the plants suitably and thereby promote the photo synthesizing action performed by the plants.

I claim:

1. A light radiator, characterized in that said light radiator comprises a transparent cylinder, an optical conductor for guiding light rays into said cylinder through one end of said cylinder, optical means movably accommodated in said cylinder for reflecting said light rays guided into said cylinder from said optical conductor and radiating said light rays outside said cylinder, and driving means for moving said optical means along an axis direction of said cylinder, said optical means being constructed with a transparent member of elliptic globe shape having a short diameter approximately equal to the inner diameter of said cylinder and comprising an air chamber having a reflection surface for reflecting light rays guided into said cylinder and radiating the same outside said cylinder, said driving means comprising optical oil filled in said cylinder and a liquid pump having an end portion communicating with the end portion of said cylinder and said pump having another end portion communicating with an opposite end portion of the cylinder, and said optical means being moved in said cylinder by use of said liquid pump.

2. A light radiator as defined in claim 1, characterized in that said driving means is a generator for producing a differential pressure applied between both ends of said cylinder.

3. A light radiator as defined in claim 1, characterized in that a large number of said cylinders are unitarily combined with each other.

4. A light radiator as defined in claim 1, characterized in that said cylinder is unitarily combined with an optical oil supplying pipe for supplying optical oil therein.

5. A light radiator as defined in claim 1, characterized in that said light radiator comprises two photo sensors along an axis direction of said cylinder on an outer circumferential portion of said cylinder, light rays reflected by said optical means being detected by use of said photo sensor in order to control said driving means and thereby change a movement direction of said optical means.

6. A light radiator as defined in claim 5, characterized in that a position of said photo sensor can be adjusted along an axis direction of said cylinder.

7. A light radiator as defined in claim 1, characterized in that said cylinder has a circular arc portion.

8. A light radiator as defined in claim 7, characterized in that said cylinder is constructed in a state of loop.

9. A light radiator as defined in claim 7, characterized in that said cylinder is constructed in a state of spiral.

10. A light radiator as defined in claim 1, characterized in that a permanent magnet is installed at a position where the light rays reflected by said optical means is not prevented from passing therethrough.

11. A light radiator as defined in claim 10, characterized in that said light radiator comprises two magnetic sensors along an axis direction of said cylinder on an outer circumferential portion thereof, said permanent magnet or magnetic substance being detected by use of said magnetic sensor in order to control said driving means and thereby control a movement direction of said optical means.

12. A light radiator as defined in claim 11, characterized in that a position of said magnetic sensor can be adjusted along an axis direction of said cylinder.

13. A light radiator as defined in claim 10, characterized in that magnetic substance is arranged along an axis direction of said cylinder on an outer circumferential surface thereof.

14. A light radiator as defined in claim 13, characterized in that said magnetic substance is arranged in a line or belt state elongated continuously in an axis direction of said cylinder.

15. A light radiator as defined in claim 13, characterized in that said magnetic substance is arranged zigzag discontinuously in an axis direction of said cylinder.

* * * * *